United States Patent [19]
Sidhu

[11] 3,772,593
[45] Nov. 13, 1973

[54] RESISTANCE MEASUREMENT SYSTEM

[76] Inventor: Pawitter S. Sidhu, 3450 Scadlock Ln., Sherman Oaks, Calif. 91403

[22] Filed: Nov. 3, 1971

[21] Appl. No.: 195,331

[52] U.S. Cl. ............ 324/62 R, 128/2.1 Z, 324/71 R
[51] Int. Cl. ............................................. G01r 27/02
[58] Field of Search ...................... 324/62 R, 71 R; 128/2.1 Z

[56] References Cited
UNITED STATES PATENTS

| | | | |
|---|---|---|---|
| 2,824,283 | 2/1958 | Ellison | 324/71 R X |
| 2,830,265 | 4/1958 | Ellison | 324/DIG. 1 |
| 3,047,847 | 7/1962 | Marsh et al. | 324/71 R |

Primary Examiner—Stanley T. Krawczewicz
Attorney—Albert M. Herzig et al.

[57] ABSTRACT

A resistance measurement system for measuring the change in the value of a resistance. An input circuit provides an output signal proportional to the value of the resistance. The output of the input circuit is coupled to an amplifier circuit which provides an amplified output signal representative of changes in the resistance. The output of the amplifier circuit is coupled to a display circuit which provides an indication when the resistance has increased or decreased a predetermined amount. Alternatively, the input circuit may provide an indication of the percentage change in the value of the resistance.

8 Claims, 2 Drawing Figures

PATENTED NOV 13 1973          3,772,593
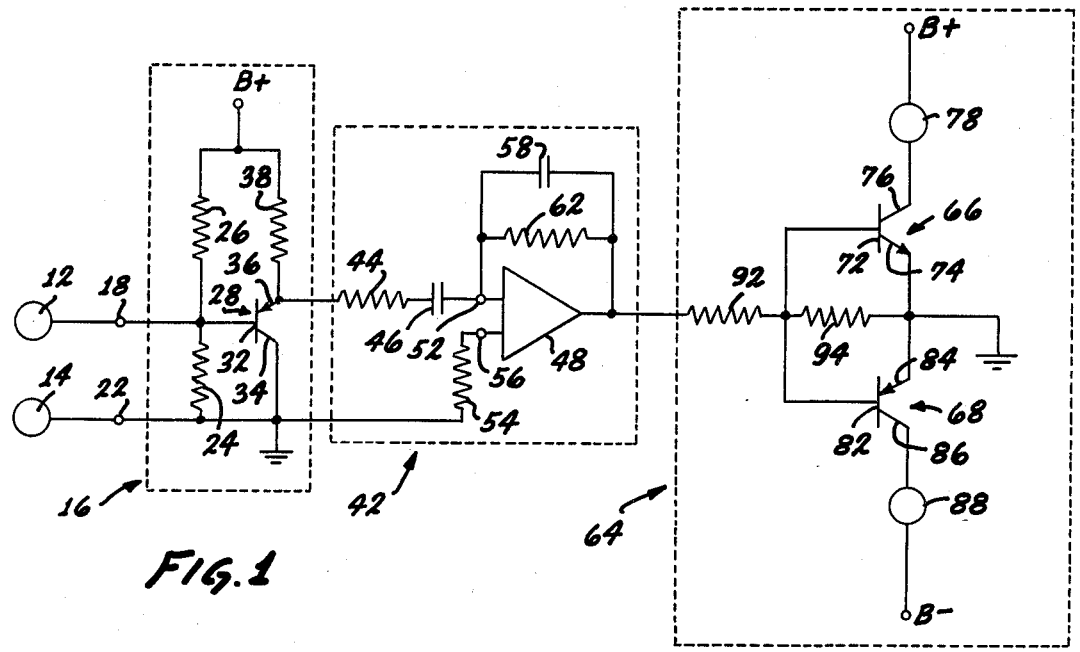
FIG.1
FIG.2
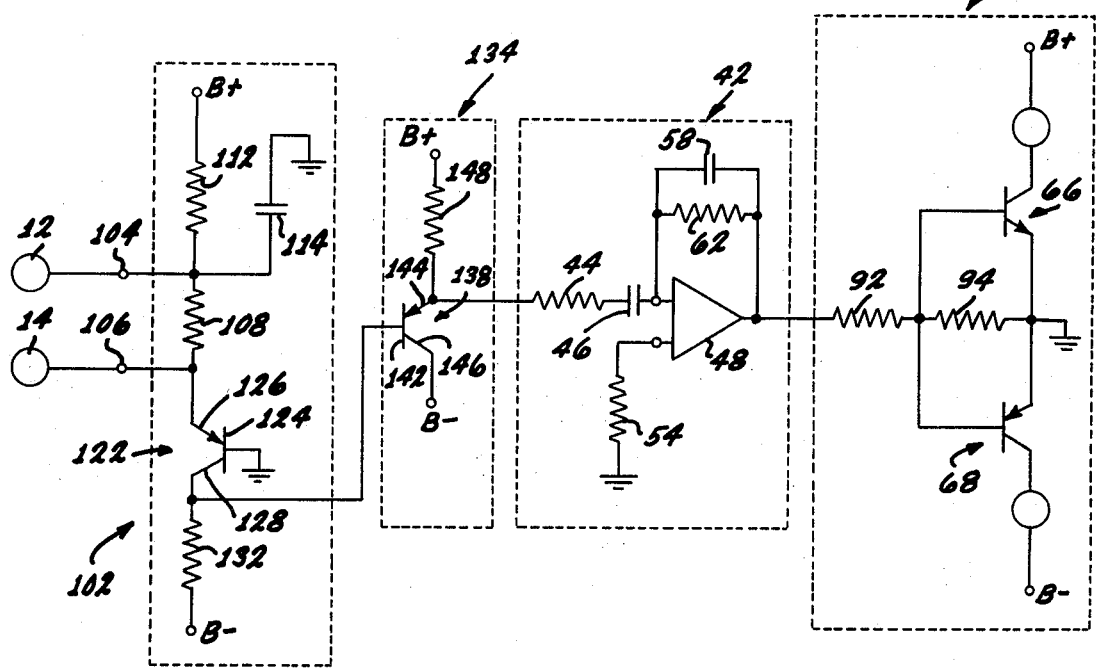

RESISTANCE MEASUREMENT SYSTEM

The invention relates in general to resistance measurement system, and more particularly, to system for measuring the change in a body skin resistance.

BACKGROUND OF THE INVENTION

Instantaneous changes in the skin resistance of a human subject can be used to determine the subject's reaction to certain stimuli. For example, it has been found that the skin resistance will change when a subject is asked questions. The subject's skin resistance change will give an indication as to how he is emotionally responding to these questions.

Since the skin resistance of a subject can vary over a wide range and is subjected to variables such as the type of electrode used, the electrode paste and the spacing between the electrodes, it is necessary to measure the change in the skin resistance as emotional stimuli are varied to determine the subject's reaction.

The present invention provides a resistance measurement system wherein the magnitude of change in the skin resistance of a subject is determined. Alternatively, the system may be modified so that the change in skin resistance is measured as a percentage change so as to minimize the wide variation in skin resistance of various subjects.

SUMMARY OF THE INVENTION

More particularly, the invention comprises a resistance measurement system for measuring the change in the value of a resistance. An input circuit provides an output signal proportional to the value of the resistance. The output of the input circuit is coupled to an amplifier circuit which provides an amplified output signal representative of changes in resistance. The output of the amplifier circuit is coupled to a display circuit which provides an indication when the resistance has increased or decreased a predetermined amount. Alternatively, the input circuit may provide an indication of the percentage change in the value of the resistance.

The advantages of this invention, both as to its construction and mode of operation, will be readily appreciated as the same become better understood by reference to the following detailed description when considered in connection with the accompanying drawings, in which like referenced numerals designate like parts throughout the figures.

BRIEF DESCRIPTION OF THE DRAWINGS

FIG. 1 depicts a skin resistance measurement system for determining changes in the resistance; and FIG. 2 illustrates an alternative embodiment of the system of FIG. 1 wherein the changes are measured as percentage changes in the skin resistance.

DESCRIPTION OF THE PREFERRED EMBODIMENT

Referring now to the drawings, there is shown in FIG. 1 preferred embodiment of the skin resistance measurement system made in accordance with the principles of the invention. A pair of electrodes 12, 14, are placed, spaced apart, on the subject whose skin resistance change is to be measured. Normally, electrode paste is applied to the skin and the electrodes applied thereon.

The electrodes 12, 14 are connected to an input circuit 16 at its input terminals 18, 22. Connected across the input terminals is resistor 24, one side of the resistor as well as the terminal 22 also being connected to ground. The other side of the resistor 24 is connected to one side of a resistor 26, the other side of which is connected to a source of positive reference potential B+.

The junction of the resistors 24 and 26 is connected to a transistor 28 at its base 32. The transistor 32 further comprises a collector 34 which is connected to ground and an emitter 36 which is connected through a biasing resistor 38 to the source of positive reference potential B+.

The resistor 26 is chosen so that it is at least five to ten times larger than the human body skin resistance across the terminals 12, 14. Typically, for a human being, the skin resistance could vary from 10,000 to 60,000 ohms dependent upon the emotional condition of the subject as well as the electrode used, the type of electrode paste used to connect the electrode to the subject, and the relative spacing between the electrodes. Thus, by choosing such a large value of resistance for the resistor 26, the resistor 26 acts as a constant current source and limits the voltage applied to the skin.

The resistor 24 is chosen so that it is approximately one-half the value of the resistor 26. However, its value is not critical as long as it is larger than skin resistance range so that the signal variations applied to the base 32 of transistor 28 are basically controlled by the value of changes in the skin resistance.

Since the skin resistance is relatively high and variable from person to person, the transistor 28 is connected in emitter-follower configuration so that the high impedance at the base of transistor 28 is transformed into a low impedance at the emitter 36.

Further, the value of the biasing resistor 38 is chosen so as to maximize the Beta or forward current transfer ratio so as to minimize the output impedance of the transistor 28, since the output impedance is proportional to the input impedance and inversely proportional to Beta. Thus, for a 50,000 ohm variation in the input resistance to the transistor 28, a Beta of 100 provides approximately a 500 ohm variation at the output of transistor 28.

Output signals from the input circuit 16 are coupled to an amplifier circuit 42. Input signals to the amplifier circuit are coupled from the emitter 36 of the transistor 28 to one side of an input resistor 44, the other side of which is coupled to one side of a DC blocking capacitor 46. The other side of the capacitor 46 is coupled to an operational amplifier 48 at its input terminal 52. Further, a resistor 54 is connected between the other input terminal 56 of the amplifier 48 and ground.

A capacitor 58 is connected across the amplifier 48 between input terminal 52 and the amplifier output terminal to limit the high frequency gain of the amplifier 48. Further, a resistor 62 is connected between terminal 52 and the output terminal of the amplifier.

Input signals from the circuit 16 representative of the value of the skin resistance are coupled to the amplifier circuit 42. The input terminals 52 and 56 are connected such that the input signal is inverted. Further, the input signal is amplified by the operational amplifier 48 with the gain proportional to the ratio of the resistor 62 to the resistor 44.

The blocking capacitor 46 decouples the input DC level from the amplifier input. Thus, only changes in the input level are amplified by the amplifier 48 and DC or very low frequency signals are rejected.

Further, it should be noted that the operational amplifier provides a very low output impedance. Moreover, the impedance of the blocking capacitor 46 is less than one-tenth the impedance of resistor 44 at the frequency of the skin resistance variation signals. Thus, for calculation purposes, the value of the resistor 44 is the input resistance to the operational amplifier.

Output signals from the amplifier circuit 42 are coupled to a display circuit 64. The display circuit comprises a first transistor 66 of NPN configuration and a second transistor 68 of PNP configuration. The transistor 66 comprises a base 72, an emitter 74 which is connected to ground, and a collector 76 which is connected through a display bulb 78 to a source of positive potential B+.

The transistor 68 comprises a base 82, an emitter 84 which is connected to ground, and a collector 86 which is connected through a display bulb 88 to a source of negative potential B−.

Input signals to the display circuit 64 are coupled from the output of amplifier 48 to one side of an input resistor 92 which limits current drawn from the amplifier circuit. The other side of the resistor 92 is connected to the base terminals 72 and 82 of transistors 66 and 68, respectively. Further, a biasing resistor 94 is connected between the base terminals 72 and 74 and ground.

The transistors 66 and 68 are non-conductive when there is no input signal or a low input signal from the amplifier circuit 16 due to the reverse biasing effects of the resistor 94. Further, the resistor 94 prevents circuit noise or small input signals from turning on the transistors 66 or 68.

When the skin resistance across the electrodes 12 and 14 changes a sufficient amount so that the output signal of the amplifier circuit exceeds the threshold level determined by the resistor 94, one of the transistors 66 or 68 will become conductive causing the respective display light in its collector circuit to become conductive. Thus, a positive going input signal to the display circuit will cause transistor 66 to become conductive turning on display light 78 whereas a negative going signal will cause transistor 68 to become conductive causing display light 88 to become conductive.

Moreover, it should be noted that transistors 66 and 68 isolate the display lights 78 and 88, respectively, from the input of the display circuit. Further, the transistors provide a power gain to turn the lights on.

Referring now to FIG. 2, there is shown an alternative embodiment of the invention wherein the percentage change of skin resistance may be measured.

For small values of change in skin resistance, the measurement of the magnitude of the change in the manner depicted in FIG. 1 would not be accurate enough to produce a sufficient output level to actuate the display lights. Thus, the circuit of FIG. 2 provides an output signal representative of the percentage change in the skin resistance. For example, when the skin resistance is 10,000 ohms and a 100 ohm change occurs, the circuit can detect a 1 percent change in skin resistance. Alternatively, should the skin resistance be 50,000 ohms and a 500 ohm change occurs, the circuit will once again show a 1 percent change.

The skin electrodes 12, 14 are coupled to an input circuit 102 at its input terminals 104, 106. The terminals 104, 106 are connected across a resistor 108. Further, a resistor 112 is connected between a source of positive reference potential B+ and one side of the resistor 108. A capacitor 114 is connected between the junction of the resistors 108 and 112 and ground. The input circuit further comprises a transistor 122 having a base 124, an emitter 126 and a collector 128. The base 124 is connected to ground and the emitter 126 is connected to the other side of the resistor 108. Further, the collector 128 is connected through a biasing resistor 132 to a source of negative potential B+.

As in the input circuit 16 of FIG. 1, resistor 112 is chosen to be sufficiently large so that it acts as a constant current source. Moreover, resistor 108 is large with respect to the range of skin resistance such that its effect may be largely ignored.

The DC current of the input circuit is established by the value of the resistor 112 since the resistor 112 is much greater than the skin resistance. Thus, the DC voltage gain is approximately equal to the ratio of the resistors 112 and 132, ignoring the drop across the base-emitter circuit of the transistor 122.

The AC gain of the circuit is approximately equal to:

$$(R_{132}/R_{skin}/\Delta_R)$$

Where $R_{132}$ is equal to the value of resistor 132;

$R_{skin}$ is the value of the resistance across the electrodes 12 and 14; and $\Delta R$ is the change in the skin resistance.

The resistor 112 has a much greater impedance than the capacitor 114 and for alternating current, the capacitor 114 by-passes the resistor 112. The AC current of the input circuit is thus proportional to $(\Delta R/R_{skin}.)$ Therefore, the circuit output for any AC change is proportional to the percentage change of the skin resistance. As previously pointed out, for small changes in skin resistance, the percentage change is a more accurate indication of the skin resistance change than the absolute resistance change.

Output signals from the input circuit 102 are coupled to a buffer circuit 134. The circuit 134 comprises a transistor 138 having a base 142, as emitter 144 and a collector 146.

Output signals from the input circuit 102 are coupled from the collector 128 of transistor 122 to the base 142 of transistor 138. Further, emitter 144 is connected through a biasing resistor 148 to a source of positive potential B+ and the collector 146 is connected to a source of negative potential B−.

The transistor 138 is connected in emitter-follower configuration so that the high impedance output of the input circuit may be transformed as a low impedance to the input of the amplifier circuit 42. The amplifier circuit in turn is coupled to a display circuit 64. The amplifier circuit 42 and display circuit 64 perform similar functions as they do in FIG. 1 and, thus, will not be described in detail.

It should be pointed out that the PNP and NPN configured transistors could be reversed with a corresponding change in the connection of the bias potentials.

Moreover, it should be pointed out that in FIG. 2, if resistor 132 were lowered to a sufficient value, the buffer circuit could be eliminated. Alternatively, the buffer circuit function could be performed by an operational amplifier.

Moreover, while the display circuit 64 has been shown actuating a pair of display lights, it should be understood that the transistors 66 and 68 could be used to actuate a relay or an audio signal instead of lights.

What is claimed is:

1. A resistance measuring system for measuring the varying change in the value of resistance comprising:
   a. input circuit means for providing a first output signal proportional to the value of said resistance as said resistance varies;
   b. an amplifier circuit having said output signal coupled to the input thereof;
   c. whereby said amplifier circuit produces an amplified output signal proportional to the variation in said resistance and
   d. indicator means connected to said amplifier circuit for producing an indication representative of both the increase and decrease in said resistance.

2. A resistance measuring system in accordance with claim 1, wherein said first output signal is an indication of the percentage change in said resistance.

3. A resistance measuring system in accordance with claim 1, wherein said amplifier circuit includes filtering means for decoupling the input DC level from the amplifier input, said amplifier circuit thereby amplifying only changes in said resistance.

4. A resistance measuring system in accordance with claim 1, wherein said indicator means provides a first output indication when said resistance increases beyond a predetermined level and a second output indication when said resistance decreases below said predetermined level.

5. A resistance measurement system in accordance with claim 1, wherein said input circuit is responsive only to changes in said resistance.

6. A resistance measuring system in accordance with claim 1, wherein the AC current of said input circuit is proportional to $(\Delta R/R)$ where $\Delta R$ is the incremental change in said resistance; and R is the value of said resistance.

7. A resistance measuring measuring for mesuring the change in the value of a resistance comprising: input circuit means for providing first output signal proportional the value of said resistance; an amplifier circuit having said output signal coupled to the input thereof, said amplifier circuit producing a second output signal proportional to the change in said resistance; indicator means connected to said amplifier circuit for producing a third output representative of a change in said resistance, wherein said input circuit comprises a transistor connected in emitter-follower configuration, said resistance being coupled across the base-collector circuit of said transistor and wherein amplified output signals representative of said value of resistor are coupled from the emitter of said transistor to a filter the output signal of which is representative of changes in said resistance, and wherein said filter output signal is coupled to an operational amplifier, and further wherein said output operational amplifier is coupled to a pair of transistors, one of said transistors being conductive when said resistance change increases beyond a predetermined value and the other of said transistors being conductive when said resistance change decreases beyond a predetermined value.

8. A resistance measuring system in accordance with claim 1 including a pair of electrodes connected to said input circuit adapted to contact the resistance to be measured.

* * * * *